(12) United States Patent
Saleh

(10) Patent No.: US 11,488,343 B2
(45) Date of Patent: *Nov. 1, 2022

(54) MECHANISM FOR SUPPORTING DISCARD FUNCTIONALITY IN A RAY TRACING CONTEXT

(71) Applicant: Advanced Micro Devices, Inc., Santa Clara, CA (US)

(72) Inventor: Skyler Jonathon Saleh, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,978

(22) Filed: Feb. 3, 2021

(65) Prior Publication Data

US 2021/0158601 A1 May 27, 2021

Related U.S. Application Data

(63) Continuation of application No. 16/219,799, filed on Dec. 13, 2018, now Pat. No. 10,930,050.

(51) Int. Cl.
*G06T 15/06* (2011.01)
*G06T 15/00* (2011.01)
*G06T 15/80* (2011.01)

(52) U.S. Cl.
CPC ............ *G06T 15/06* (2013.01); *G06T 15/005* (2013.01); *G06T 15/80* (2013.01)

(58) Field of Classification Search
None
See application file for complete search history.

(56) References Cited

U.S. PATENT DOCUMENTS

| 2009/0225081 | A1* | 9/2009 | Keller | G06T 15/06 345/426 |
| 2010/0328310 | A1* | 12/2010 | Peterson | G06T 15/06 345/426 |
| 2020/0050550 | A1* | 2/2020 | Muthler | G06T 1/60 |

* cited by examiner

*Primary Examiner* — Tapas Mazumder
(74) *Attorney, Agent, or Firm* — Volpe Koenig

(57) ABSTRACT

Described herein is a technique for performing ray tracing. According to this technique, instead of executing intersection and/or any hit shaders during traversal of an acceleration structure to determine the closest hit for a ray, an acceleration structure is fully traversed in an invocation of a shader program, and the closest intersection with a triangle is recorded in a data structure associated with the material of the triangle. Later, a scheduler launches waves by grouping together multiple data items associated with the same material. The rays processed by that wave are processed with a continuation ray, rather than the full original ray. A continuation ray starts from the previous point of intersection and extends in the direction of the original ray. These steps help counter divergence that would occur if a single shader program that inlined the intersection and any hit shaders were executed.

20 Claims, 8 Drawing Sheets

| Lane 1 (Ray 1) | Lane 2 (Ray 2) | Lane 3 (Ray 3) | Lane 4 (Ray 4) |
|---|---|---|---|
| Intersection Shader(O₁) | Acceleration Structure Traversal to O₁ | Acceleration Structure Traversal to O₁ | Acceleration Structure Traversal to O₁ |
| Any Hit Shader(O₁) | Idle | Idle | Idle |
| Acceleration Structure Traversal to O₂ | Acceleration Structure Traversal to O₂ | Acceleration Structure Traversal to O₂ | Acceleration Structure Traversal to O₂ |
| Idle | Intersection Shader(O₂) | Idle | Idle |
| Idle | Any Hit Shader(O₂) | Idle | Idle |
| Acceleration Structure Traversal to O₃ | Acceleration Structure Traversal to O₃ | Acceleration Structure Traversal to O₃ | Acceleration Structure Traversal to O₃ |
| Idle | Idle | Intersection Shader(O₃) | Idle |
| Idle | Idle | Any Hit Shader(O₃) | Idle |
| Acceleration Structure Traversal to O₄ | Acceleration Structure Traversal to O₄ | Acceleration Structure Traversal to O₄ | Acceleration Structure Traversal to O₄ |
| Intersection Shader(O₄) | Intersection Shader(O₄) | Idle | Idle |
| Any Hit Shader(O₄) | Any Hit Shader(O₄) | Idle | Idle |
| Acceleration Structure Traversal to O₅ | Acceleration Structure Traversal to O₅ | Acceleration Structure Traversal to O₅ | Acceleration Structure Traversal to O₅ |
| Idle | Idle | Idle | Intersection Shader(O₅) |
| Idle | Idle | Idle | Any Hit Shader(O₅) |
| Acceleration Structure Traversal to O₆ | Acceleration Structure Traversal to O₆ | Acceleration Structure Traversal to O₆ | Acceleration Structure Traversal to O₆ |
| Idle | Idle | Idle | Intersection Shader(O₆) |
| Idle | Idle | Idle | Any Hit Shader(O₆) |
| Acceleration Structure Traversal to O₇ | Acceleration Structure Traversal to O₇ | Acceleration Structure Traversal to O₇ | Acceleration Structure Traversal to O₇ |
| Idle | Idle | Intersection Shader(O₇) | Idle |
| Idle | Idle | Any Hit Shader(O₇) | Idle |
| Acceleration Structure Traversal to O₈ | Acceleration Structure Traversal to O₈ | Acceleration Structure Traversal to O₈ | Acceleration Structure Traversal to O₈ |
| Closest Hit Shader(O₄) | Idle | Idle | Idle |
| Idle | Closest Hit Shader(O₂) | Closest Hit Shader(O₇) | Idle |
| Idle | Idle | Idle | Closest Hit Shader(O₅) |

Divergence 502(1), 502(2), 502(3), 502(4), 502(5), 502(6), 502(7), 502(8)

FIG. 5

MECHANISM FOR SUPPORTING DISCARD FUNCTIONALITY IN A RAY TRACING CONTEXT

CROSS-REFERENCE TO RELATED APPLICATIONS

This application claims the benefit of U.S. Non-Provisional application Ser. No. 16/219,799, entitled "MECHANISM FOR SUPPORTING DISCARD FUNCTIONALITY IN A RAY TRACING CONTEXT," filed on Dec. 13, 2018, the entirety of which is hereby incorporated herein by reference.

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein:

FIG. 5 illustrates example execution on an example SIMD unit that includes four lanes;

DETAILED DESCRIPTION

Described herein is a technique for performing ray tracing. According to this technique, instead of executing intersection and/or any hit shaders during traversal of an acceleration structure to determine the closest hit for a ray, an acceleration structure is fully traversed in an invocation of a shader program, and the closest intersection with a triangle is recorded in a data structure associated with the material of the triangle. Later, a scheduler launches waves by grouping together multiple data items associated with the same material. The rays processed by that wave are processed with a continuation ray, rather than the full original ray. A continuation ray starts from the previous point of intersection and extends in the direction of the original ray. These steps help counter divergence that would occur if a single shader program that inlined the intersection and any hit shaders were executed.

Figure 1:
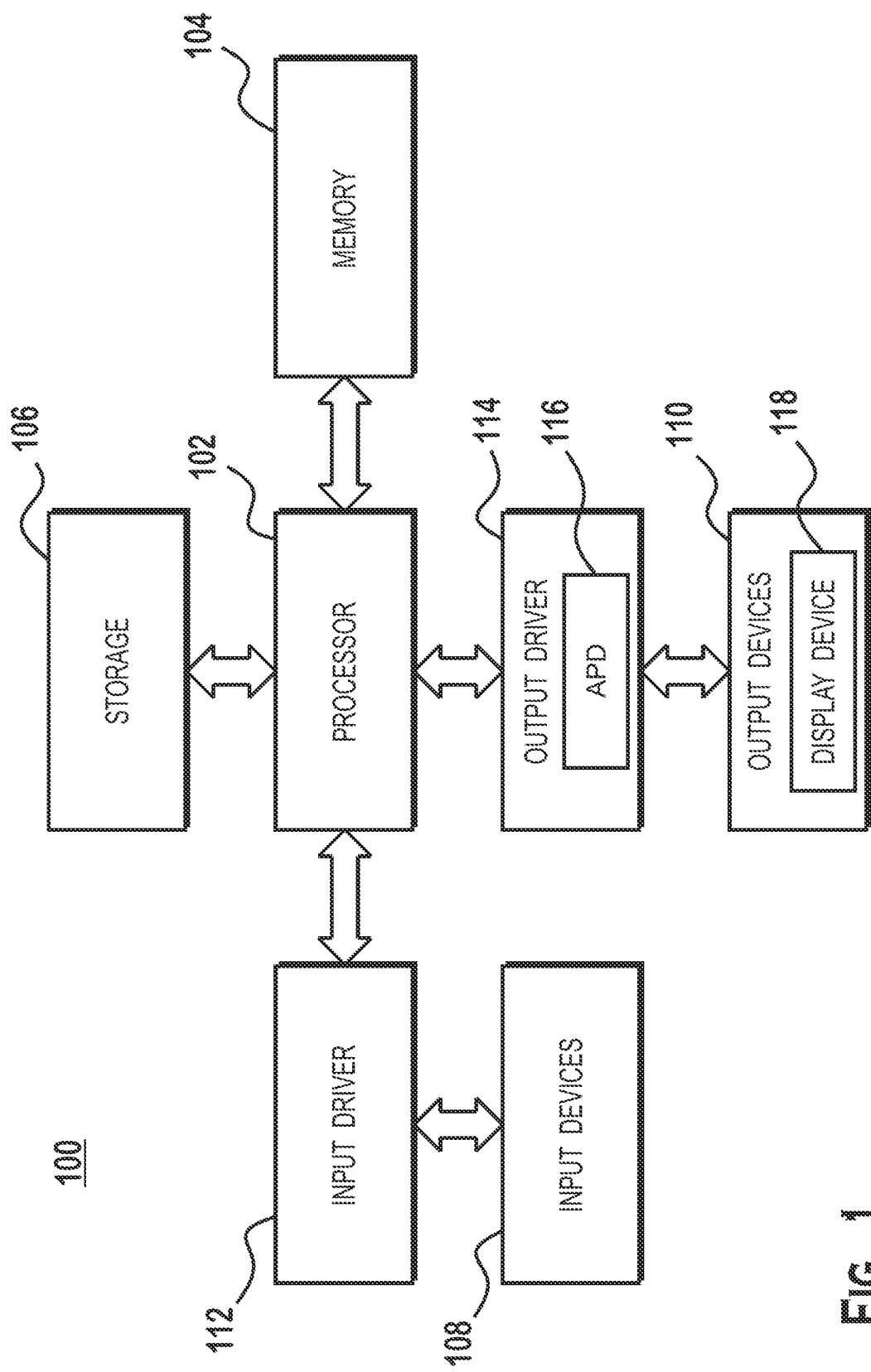
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
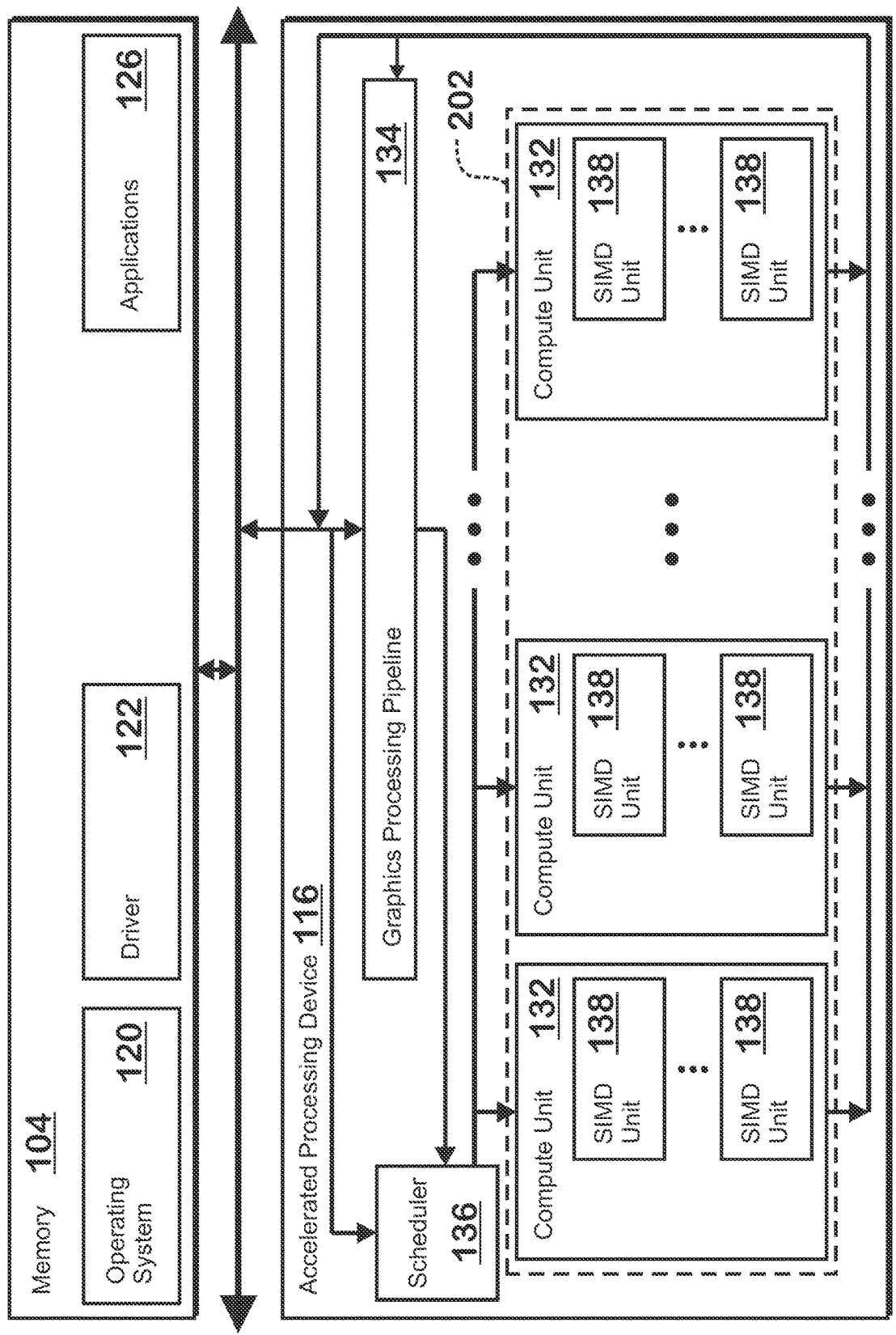
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
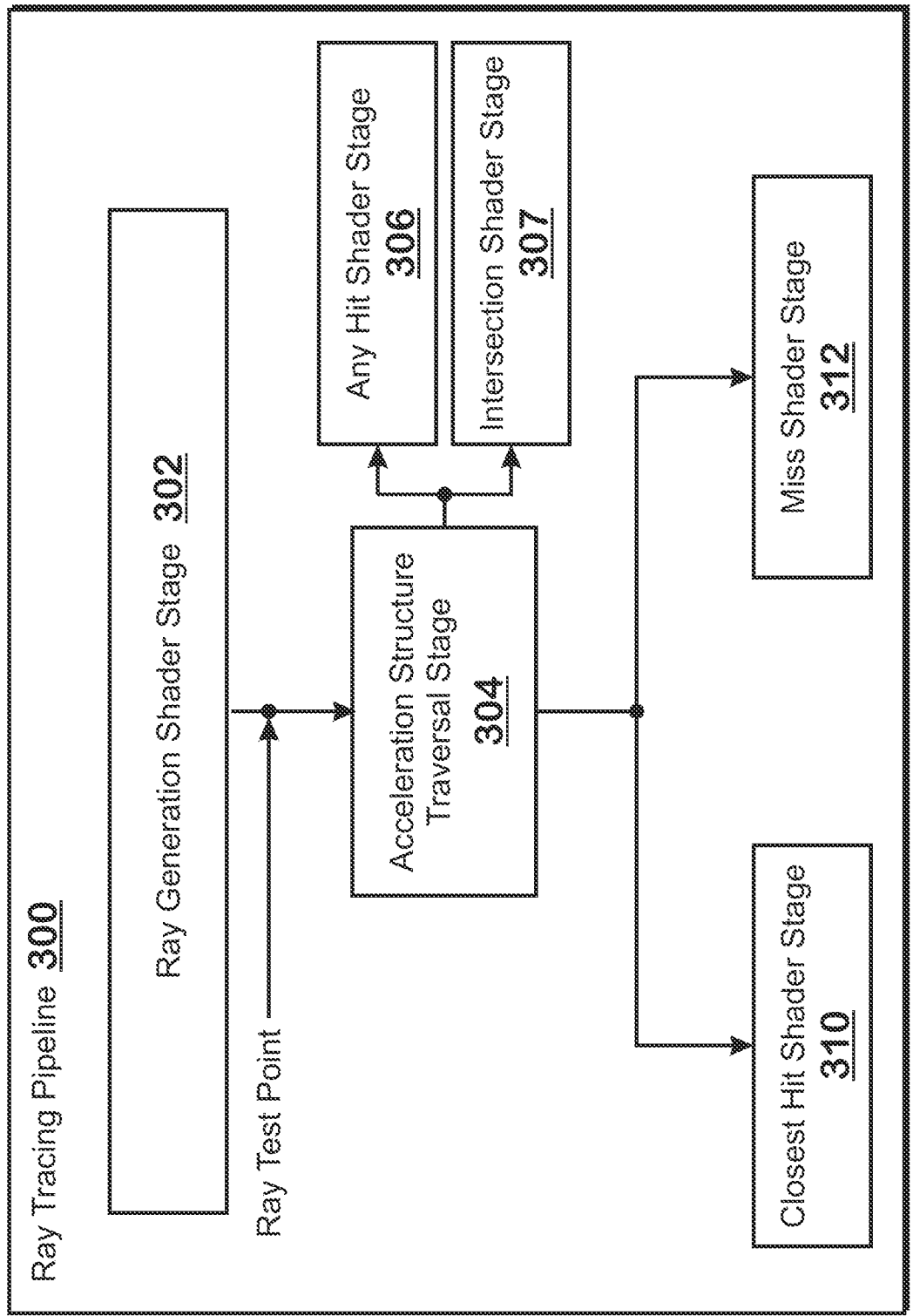
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This bounding volume hierarchy is the "acceleration structure" referred to elsewhere herein. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray intersection test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
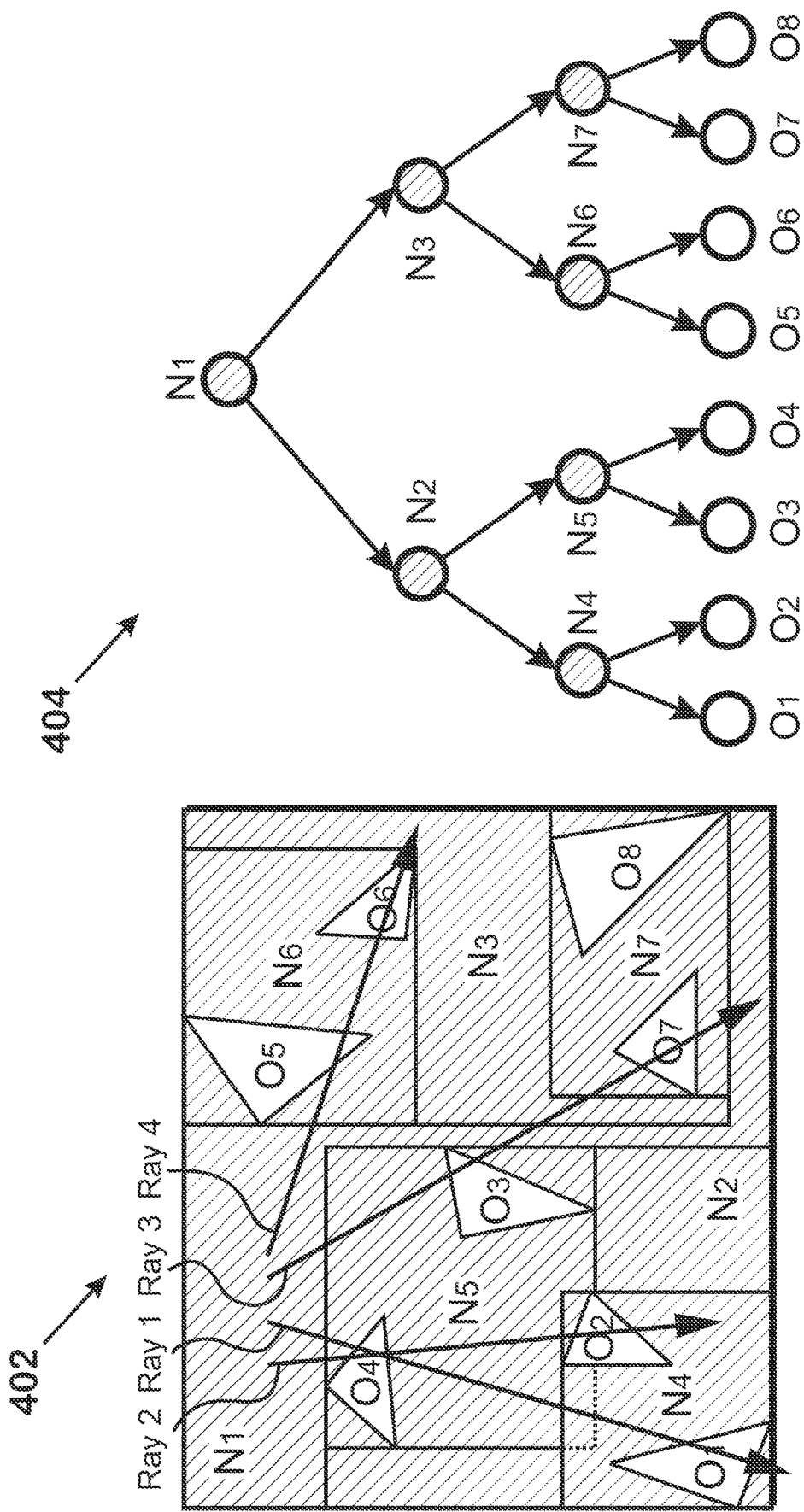
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 shoots rays to detect whether the rays hit triangles and how such hits should be shaded. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, the ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of the ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$), executes appropriate any hit and an/or intersection shaders, and executes appropriate closest hit or miss shaders based on the results of the any hit and/or intersection shaders.

One way to implement execution through the ray tracing pipeline 300 is with a ray tracing pipeline shader program that executes in the SIMD units 138. Operations of such a shader program are illustrated in FIG. 5. Specifically, FIG. 5 illustrates execution on an example SIMD unit that includes four lanes. It should be understood that a SIMD unit may have any number of lanes and many have more than four. However, a SIMD unit having four lanes is provided as an example.

SIMD execution involves executing a single program in parallel for multiple data items. With SIMD execution, there is only one program counter, and thus currently executing instruction, across multiple lanes, where each lane executes the program for different data items. It is possible for execution to be divergent among the lanes. Divergent control flow is control flow where different lanes execute different instructions of a program. In general, divergent control flow occurs when branch instructions evaluate such that different lanes execute different paths through the program. In an example, the lanes arrive at an if statement. Two of the lanes evaluate the if statement as true and thus execute the instructions in the body of the if statement. Two of the lanes evaluate the if statement as false and thus do not execute those instructions (those lanes branch to a point after the body of the if statement). Because there is only one program counter, the two control flow paths are serialized. Specifically, the lanes that do not execute the instructions of the body of the if statement are idle while the other lanes are executing the instructions of the body of the if statement. This idleness is associated with divergent control flow.

In FIG. 5, there is a large amount of divergent control flow because the path taken through the ray tracing pipeline 300 is such that, usually, only one lane will execute any particular any hit shader, intersection shader, or closest hit shader. While those shaders are executing, the other lanes are idle. This idleness is not desirable because it reduces the throughput of the SIMD units 138. A detailed explanation of the operations of FIG. 5 is now provided.

The operations of FIG. 5 begin with an example SIMD unit 138 executing a pipeline shader program that implements the ray tracing pipeline 300 with four rays: rays 1-4 of FIG. 4. Each of the shaders of the ray tracing pipeline 300 (the any hit shader 306, the intersection shader 307, the closest hit shader 310, and the miss shader 312) is "inlined" in the pipeline shader program, meaning that these other shaders are not separate shader programs that get executed independently but instead are instructions within the pipeline shader program that get executed in the course of executing the pipeline shader program. Note that in this disclosure, the term "shader program" refers to a single program that executes from start to finish on a SIMD unit 138, with multiple lanes executing that program in parallel. To execute a shader program on a SIMD unit 138, the scheduler 136 triggers launching of a "wave," which is the logical entity that runs a shader program on a SIMD unit 138 from start to finish. A wave can also be thought of as an instance of a shader program executing in a SIMD unit 138. To execute a wave, the scheduler 136 loads the wave into a SIMD unit 138, and triggers the wave's execution on the SIMD unit 138. When the wave ends, the entire shader program has been run and is then descheduled from the SIMD unit 138. The term "shader" without the word "program" refers to instructions of a shader stage specified in the ray tracing pipeline 300 (FIG. 3) that are in-lined in a shader program. Thus, many shaders may be executed in the course of executing a single shader program.

In the pipeline shader program of FIG. 5, each ray is assigned to a different lane. Lane 1 has ray 1, lane 2 has ray 2, lane 3 has ray 3, and lane 4 has ray 4. The pipeline shader program traverses the acceleration structure (in the acceleration structure traversal stage 304) up to triangle $O_1$, and determines that ray 1 intersects triangle $O_1$. Because of this intersection, the pipeline shader program executes the any hit shader and the intersection shader. However, at this point, because ray 1 is the only ray that hits triangle $O_1$, only lane 1 executes these shaders, with lanes 2-4 being idle. This idleness is shown as divergence 502(1) in FIG. 5.

The pipeline shader program traverses the acceleration structure to triangle $O_2$, and, because only ray 2 hits that triangle, executes the intersection shader and any hit shader for that triangle only on lane 2, with all other lanes being idle (divergence 502(2)). After traversing to $O_3$, the pipeline shader program executes the intersection and any hit shaders for $O_3$ on lane 3, with all other lanes idle (divergence 502(3)). After traversing to $O_4$, in divergence 502(4), lanes 1 and 2 execute the any hit and intersection shaders for $O_4$. Additional divergences 502(5)-502(8) occur for similar reasons. Note also that divergence 502(8) represents the divergence caused by the fact that each lane executes a different closest hit shader since each triangle for which the closest hit occurs has a different material and thus a different associated closest hit shader.

As can be seen, executing a ray tracing pipeline shader program in the above manner can lead to a large amount of divergent control flow when performed on a SIMD architecture. For this reason, an alternate technique for traversing through a ray tracing pipeline 300 is now described.

According to this technique, instead of running a monolithic pipeline shader program that has the potential to execute intersection shaders and any hit shaders upon detecting an intersection between a ray and a triangle, the ray tracing pipeline 300 executes multiple smaller pipeline shader programs, where pipeline shader program traverses the acceleration structure and then, for each lane that intersects at least one triangle, writes out a material data item indicating the closest triangle that the lane intersects. Note, this material data item is not necessarily for the closest triangle that the ray for the lane is deemed to hit, but rather the closest triangle that the ray for the lane is deemed to intersect. As described elsewhere herein, the term "hit" denotes an intersection between a ray and a triangle that is not rejected by the any hit shader or intersection shader if one or both of those shaders are defined for the material of the triangle, or that is deemed to hit by virtue of there being no defined any hit shader or intersection shader for the material of the triangle. In other words, a "hit" is an intersection that is accepted by the any hit and/or intersection shaders (or by virtue of no such shaders being defined). The material data item that is written out is for the closest triangle that the ray is deemed to intersect. Each material data item is written into a material data structure associated with the material of the triangle that is intersected.

A single wave executing a smaller pipeline shader program may write material data items into multiple different material data structures. Due to the massively parallel nature of the APD 116, multiple waves executing concurrently write out material data items indicating the closest triangles rays intersect, into material data structures associated with the material of those closest triangles. The scheduler 136 examines the material data structures and launches waves to execute follow-on pipeline shader programs. Each follow-on pipeline shader program is launched for a single material. Each follow-on shader program includes the any hit shader program and the intersection shader program for the material the shader program is launched for, if those shader programs are specified for that material. Additionally, each follow-on shader program also includes instructions to traverse the acceleration structure and determine the closest intersection and to write out material data items for the closest triangle intersected by rays or for a miss of all triangles. Each follow-on shader program also includes a closest hit shader for the material the shader program is launched for. Each ray (and thus each lane) will execute either: the acceleration structure traversal and material data item write-out; or the closest hit shader. More specifically, if the hit and/or intersection shader determines that the intersection is a miss, then a new ray (a "continuation ray") is shot out and the first triangle intersected by that ray will be processed in its own follow-on shader program wave. However, if the hit and/or intersection shader determines that the intersection is a hit, then the triangle being processed in the follow-on shader program is the closest-hit triangle for the ray, and the closest hit shader is used to shade the ray based on the properties of the material of that closest-hit triangle.

Note that because the material is same for any given follow-on shader program, the any hit shader and intersection shader are convergent—all lanes execute the any hit shader and/or the intersection shader if set for that material. Depending on the results of the any hit shader and the intersection shader in any particular lane, a lane either executes a closest hit shader for the material associated with the currently running wave, or traverses the acceleration structure to determine a new closest intersection and then writes out a material data item for the ray into a material data structure associated with the material of the closest intersection triangle.

In follow-on shaders, for any particular lane, the traversal of the acceleration structure is done via a continuation ray. A continuation ray is a "continuation" of the ray that triggered execution of the follow-on shader. A continuation ray begins at the point of intersection of the triangle whose intersection triggered execution of the follow-on shader program and extends in the direction of the ray involved in that intersection. In an example, referring to FIG. 4, ray 1 is shot and intersection of ray 1 with triangle $O_4$ triggers generation of a material data item for placement into a material data structure associated with the material of triangle $O_4$. Later, a wave is launched that executes a follow-on shader program for that material. That follow on shader program executes an intersection and/or any hit shader associated with triangle $O_4$ and, if the intersection with triangle $O_4$ is deemed to be a miss, shoots a continuation ray from triangle $O_4$, in the same direction as the ray that caused the material data item to be placed into the material data structure.

In follow-on shader programs, traversal of the acceleration structure does not begin at the first triangle in that structure, but instead begins at the triangle whose intersection triggered generation of the material data item being processed in the follow-on shader program. Specifically, there is an order of traversal of acceleration structures, which is a pre-defined order in which triangles are tested. In the example of FIG. 4, the order of testing triangles is $O_1$, then $O_2$, then $O_3$, and so on, until $O_8$. A traversal through the acceleration structure does so in a manner in which earlier triangles in this order are tested for intersection before later triangles in this order. However, in follow-on shader programs, the traversal does not begin with the earliest triangle in the acceleration structure, but instead with the triangle after the triangle of the ray-triangle intersection that triggered generation of the material data item being processed in the follow-on shader program. In other words, when it is detected that a triangle intersects a ray, the continuation ray shot as a result of that detection begins traversal of the acceleration data structure at the triangle after the triangle that intersected the ray (a "new starting triangle").

There are at least two reasons for starting at this new starting triangle. One reason is that the triangles before this new starting triangle have already been processed for the original ray and thus do not need to be processed again. A second reason is that it is possible for a ray to intersect two triangles at exactly the same point. In this situation, there should be a mechanism to ensure that all such triangles are processed once. By starting traversal for a continuation ray after the triangle that triggered generation of that continuation ray, a continuation ray will never process a triangle that has already been processed, even if two triangles are at the same distance from the origin of the original ray.

Figure 6:
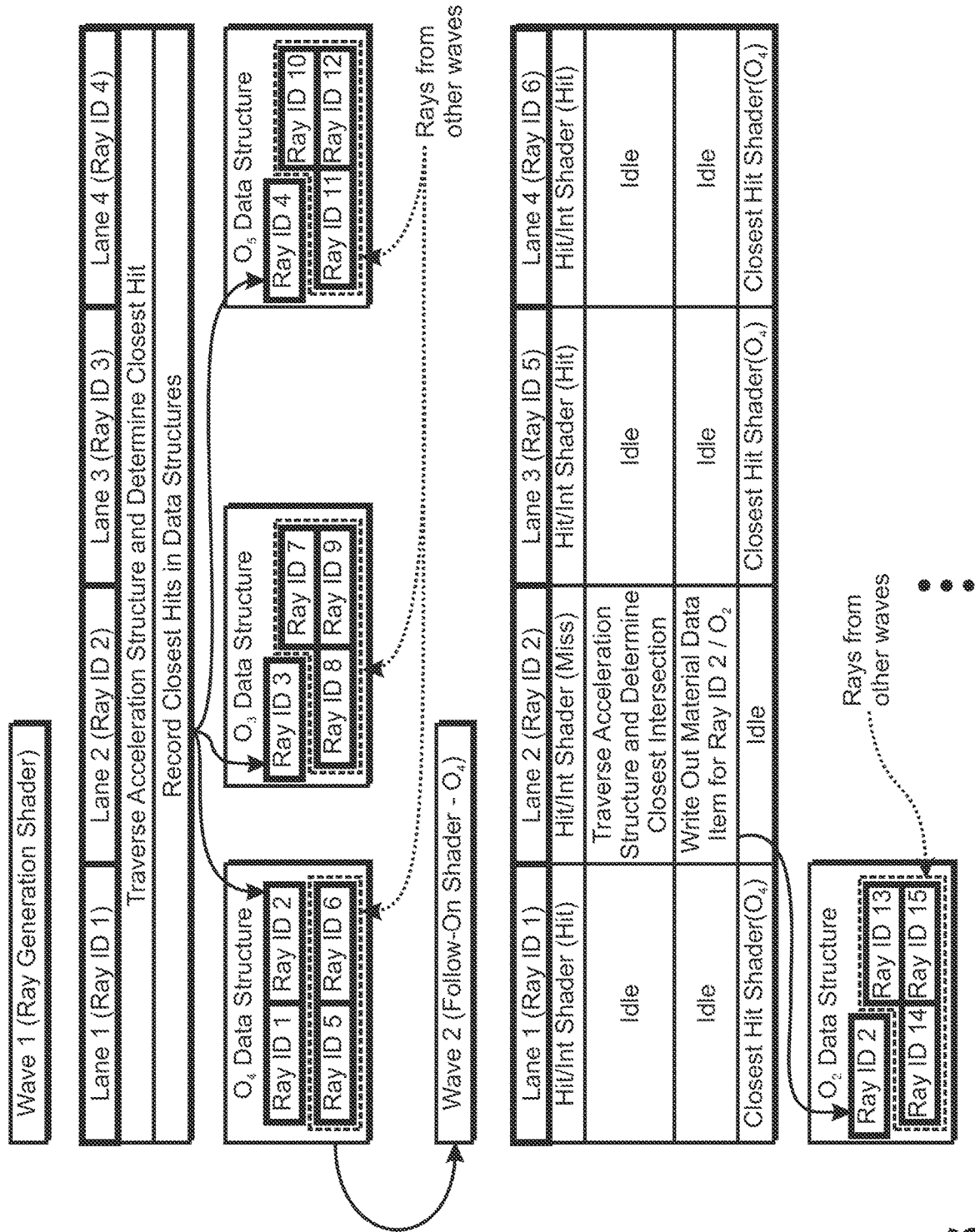
FIG. 6 illustrates example execution of a ray generation shader and follow-on shaders.

In the example of FIG. 6, wave 2 executes a follow-on shader program for the material of triangle $O_4$. Rays 1 and 2 originate from wave 1, which executes the ray generation shader program. For any ray, the ray generation shader program is the first shader program that executes, before any follow-on shader programs. The ray generation shader program executes the ray generation shader (which is associated with the ray generation shader stage 302). Rays 5 and 6 originate from other waves, but were determined to intersect a triangle with the same material that rays 1 and 2 intersected, and thus are grouped together into wave 2. Each of rays 1, 2, 5, and 6 execute the hit and/or intersection shaders specified for the material of triangle $O_4$. This combination of shaders determines that ray 2 misses the triangle, but that rays 1, 5, and 6 hit the triangle. For ray 2, the follow-on shader traverses the acceleration structure and determines the next closest intersection, which is with triangle $O_2$, and writes out the material data item for ray 2 and triangle $O_2$ into the material data structure for $O_2$. The other lanes are idle during this acceleration structure traversal and material data item write-out. After this, lanes 1 (ray 1), 3 (ray 5), and 4 (ray 6) execute the closest hit shaders for the material of triangle $O_4$, which may, for example, result in a color being generated for that ray (e.g., the texture of $O_4$ would be sampled and the color that is sampled would be recorded as the color for the ray). Other waves would be executed for other follow-on shader programs in a similar manner.

Note that some follow-on shader programs sometimes exhibit a degree of divergence. Specifically, for any given lane, and thus any given ray, there are two possible outcomes to the execution of the hit and/or intersection shaders: either that the ray is deemed to hit the triangle or that the ray is deemed to miss the triangle. If the ray is deemed to hit the triangle, then that hit is deemed to be the closest hit for the purpose of determining whether to execute the closest hit shader. In that situation, the follow-on shader program executes the closest hit shader for that ray. If the ray is deemed not to hit the triangle, then the follow-on shader program performs acceleration structure traversal to determine the next closest intersection and writes out a material data item for that ray ID corresponding to the determined next closest intersection. Note that if the acceleration structure traversal does not indicate that the ray intersects with any other triangle, a material data item is still written out for the ray, where the material data item corresponds to a miss shader. The same technique used for collecting rays and executing waves for the same material for closest hits can be used to execute waves for miss shaders, except that the generated follow-on shader program would not execute an any hit or intersection shader, just a miss shader for the material associated with misses (e.g., the sky box).

Figure 7:
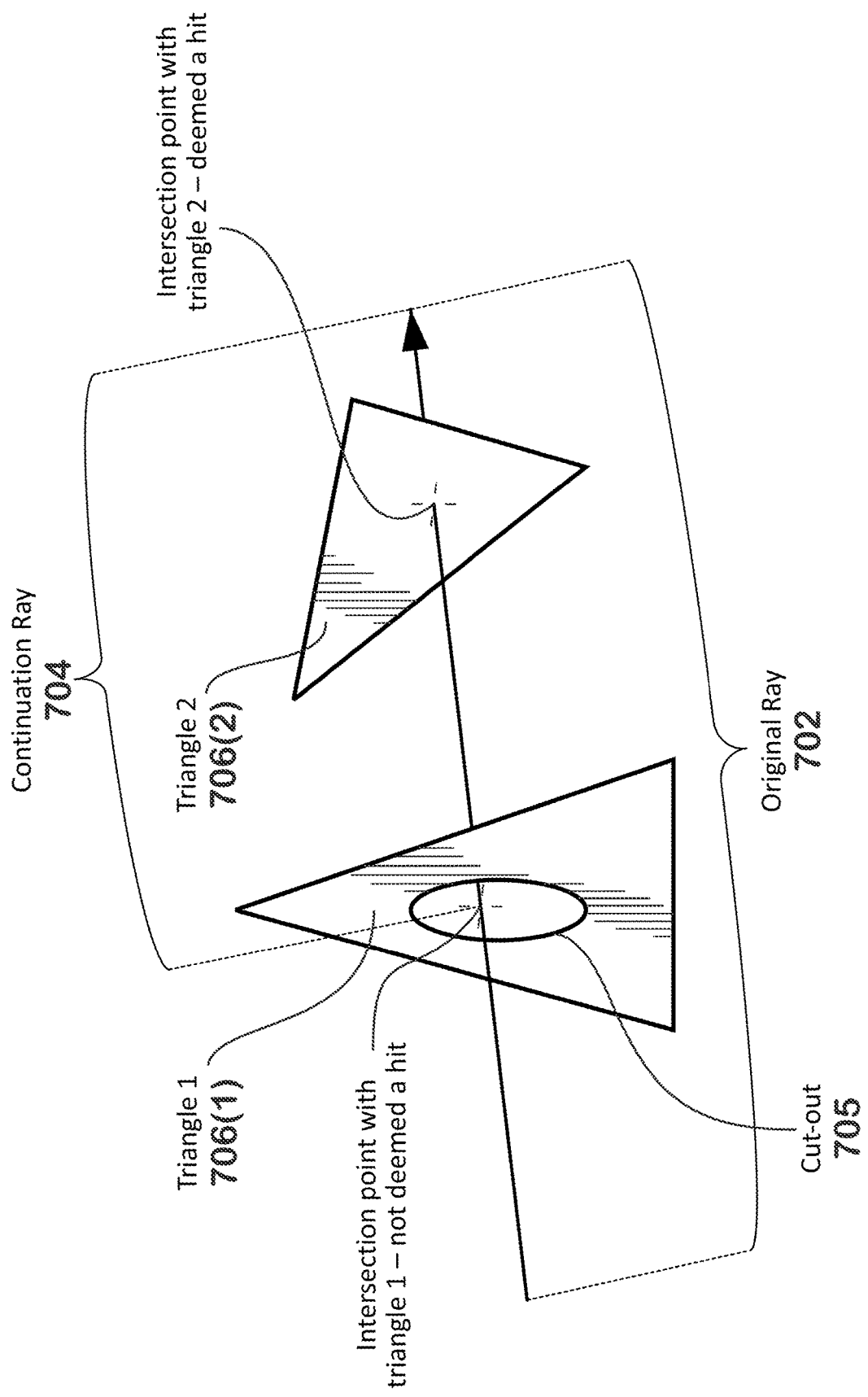
FIG. 7 illustrates an example sequence of operations associated with intersecting a ray with a series of triangles based on a ray tracing pipeline.

FIG. 7 illustrates an example sequence of operations associated with testing for intersection of a ray with a series of triangles based on a ray tracing pipeline. The ray tracing pipeline shoots a ray (the "original ray" 702) by traversing through the acceleration structure and detecting the closest intersection. In FIG. 7, the closest intersection is with triangle 1 706(1). In response to this detection, the ray tracing pipeline writes out a material data item indicating that ray 702 intersects with triangle 1 706(1), into a material data structure associated with the material of triangle 1 706(1). Other waves than the one processing the original ray 702 also write material data items into the material data structure for the material of triangle 1 706(1) (and the intersections causing such writes to occur may be intersections with triangles other than triangle 1 706(1) that nevertheless have the same material as triangle 1 706(1)).

At some point, the scheduler 136 examines the material data structure for the material of triangle 1 706(1) and launches a wave for a follow-on shader for that material. The follow-on shader performs the any hit and/or intersection shaders for the material of triangle 1 706(1). These shaders determine that the intersection with triangle 1 706(1) is not a hit because of the circular cut-out 705 illustrated. Therefore, the follow-on shader traverses the acceleration structure beginning with the triangle after triangle 1 706(1), and with a ray that begins at the intersection point between the original ray 702 and the intersection point of the original ray 702 with triangle 1 706(1) and extends in the direction of the original ray 702. The ray with which this traversal is performed is deemed a continuation ray 704. The traversal determines that the next closest intersection is with triangle 2 706(2) and therefore writes out a material data item indicating that the continuation ray 704 intersects triangle 2 706(2) into a material data structure associated with the material of triangle 2 706(2). Later, the scheduler 136 launches a wave for that material, which processes the intersection of triangle 2 706(2) with triangle 2 706(2). First, the wave executes the hit and/or intersection shaders, determining that the intersection is a hit. Then, the wave executes the closest hit shader to determine the color associated with the ray (e.g, by sampling a texture for the material of triangle 2 706(2) based on the intersection point and assigning, to the original ray 702, the sampled color).

Figure 8C:
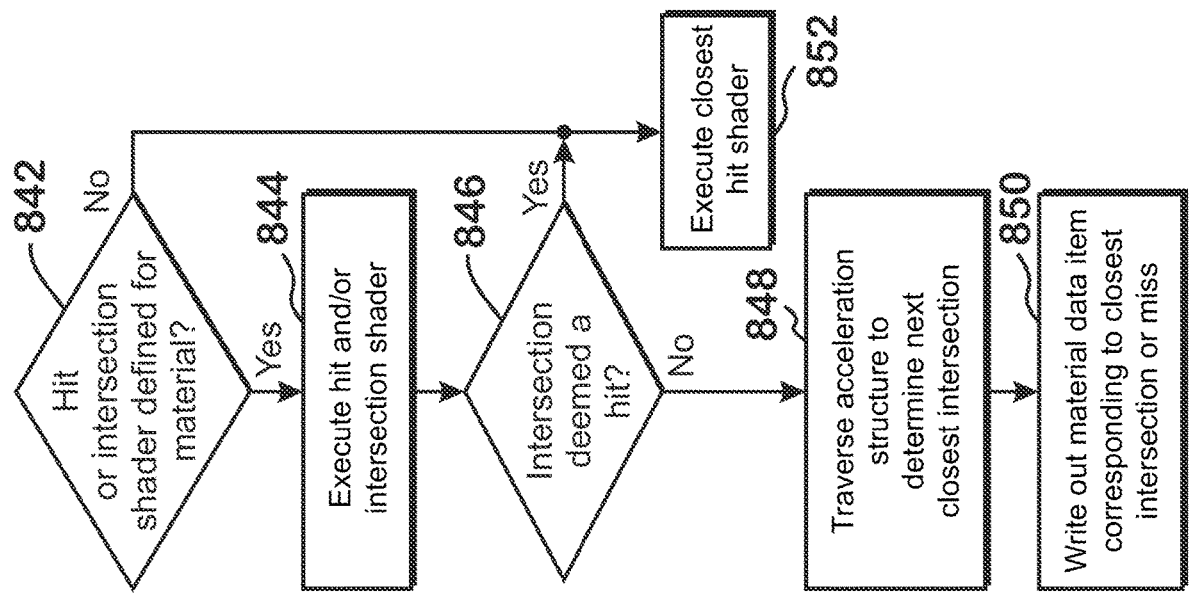
FIGS. 8A-8C depict methods for executing a ray tracing pipeline, according to examples.
Figure 8B:
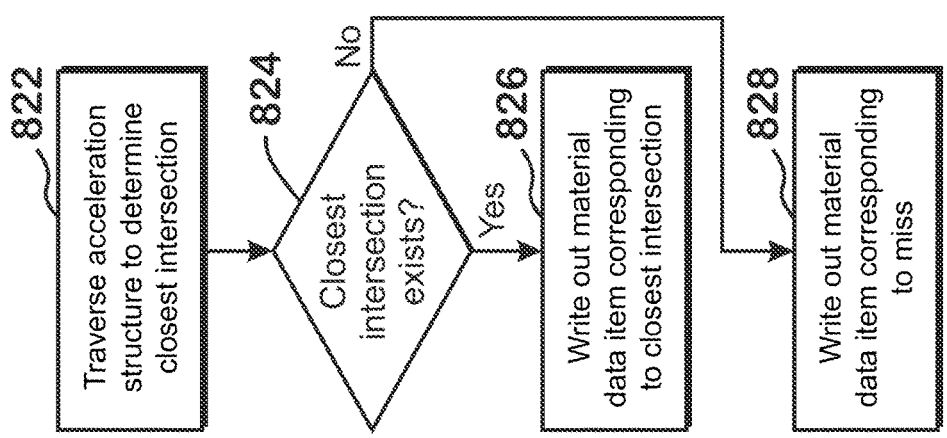
Figure 8A:
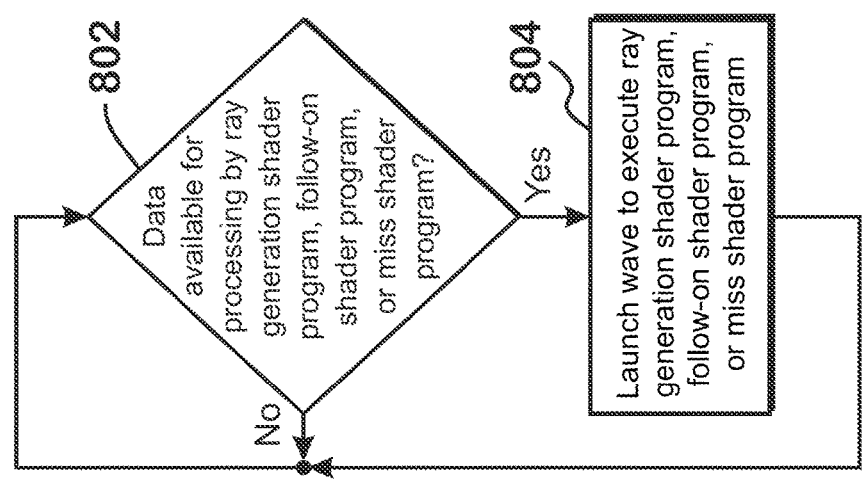

FIGS. 8A-8C depict methods for executing a ray tracing pipeline, according to examples. Specifically, FIG. 8A illustrates a method 800 for scheduling waves to execute ray generation shader programs, follow-on shader programs, and miss shader programs. FIG. 8B illustrates a method 820 for executing a ray generation shader program. FIG. 8C illustrates a method 840 for executing a follow-on shader program.

Referring to FIG. 8A, the method 800 begins at step 802, where the scheduler 136 checks whether data is available for processing by a ray generation shader program, a follow-on shader program, or a miss shader program. Data is available for a ray generation shader program when commands for executing a ray generation shader, issued by, for example, the processor 102, are received and processed in the APD 116. More specifically, as described elsewhere herein, the ray tracing technique is initiated by ray generation shaders, which spawn rays for processing through the ray tracing pipeline 300. In some examples, the ray generation shaders are written by a programmer and compiled into an application 126. The application 126, via the driver 122, transmits the compiled ray generation shaders to the APD 116 for processing. The scheduler 136 launches waves to process such rays in groups in parallel on SIMD units 138.

Data is available for follow-on shader programs when shader programs write material data items into material data structures as described elsewhere herein. The scheduler 136 examines these material data structures and, when material data items are available, launches follow-on shader programs to process the material data items in groups in parallel on SIMD units 138.

Data is available for miss shader programs when shader programs write material data items into material data structures for misses. As with the material data structures for follow-on shader programs, the scheduler 136 examines the material data structures for misses and, when material data items for misses are available, launches miss shader programs to process the material data items for misses in groups in parallel on SIMD units 138.

At step 804, the scheduler 136 launches the shader programs as just described. After step 804, the scheduler 136 loops back to step 802. Note that if, at step 802, data is not available for launching any of the shader programs, the method 800 loops back around to step 802.

Method 820, describing execution of the ray generation shader programs 820, is performed as follows. At step 822, the ray generation shader program traverses the acceleration structure to determine the closest intersection. During this traversal, no any hit shader or intersection shader is executed. At step 824, the ray generation shader program determines whether the ray intersects any triangles (whether a closest intersection exists). If the ray intersects a triangle, then the ray generation shader program writes out a material data item corresponding to the closest intersection. This material data item identifies the material of the closest hit triangle and also identifies the ray that is hit. The material data item is written into a material data structure associated with this material. Referring back to step 824, if there is no intersection between the ray and a triangle, then the method 820 proceeds to step 828, where the ray generation shader program writes out a material data item corresponding to a miss. This material data item is written to a material data structure associated with the material for a miss (e.g., a sky box, which is a texture for the sky or ambient area) and specifies the ray that did not intersect a triangle. Note that although step 824 is illustrated as a choice between two paths, because multiple lanes execute in parallel on the SIMD units 138, different lanes may take different paths for a given wave. In that situation, both paths after step 824 will be executed, but each side for different lanes.

Method 840, describing execution of the follow-on shader program for a particular wave and material, is performed as follows. At step 842, the follow-on shader program determines whether there is a hit and/or intersection shader defined for the material. If neither such shader is defined, then the method 840 proceeds to step 852, since the intersection is deemed a hit. If at least one such shader is defined, then the method proceeds to step 844. At step 844, the follow-on shader program executes the appropriate hit and/or intersection shader as defined by the material. At step 846, if the intersection is deemed a hit, then the follow-on shader proceeds to step 852. At step 852, the follow-on shader executes the closest hit shader for the material associated with the follow-on shader. In this situation, the intersection for which the follow-on shader is deemed to be the closest hit and is thus shaded based on the closest hit shader.

At step 846, if the intersection is not deemed a hit, then the follow-on shader proceeds to step 848. At step 848, the follow-on shader traverses the acceleration structure to determine the next closest intersection. Then, the follow-on shader writes out a material data item for that next closest intersection. The next closest intersection may be a miss, in which case the material data item written out is for a miss shader.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing for a ray, the method comprising:
    executing, with a first wave, a ray generation shader program configured to detect a closest intersected triangle for the ray, and to write out a first material data item for the ray, into a material data structure associated with a material of the closest intersected triangle;
    identifying a plurality of material data items from the material data structure, wherein the plurality of material data items includes the first material data item and one or more material data items generated by waves other than the first wave; and
    launching a second wave executing a follow-on shader, with the identified plurality of material data items, wherein the follow-on shader is configured to:

determine whether the closest intersected triangle is to be counted as a hit; and
perform further operations for shading the ray based on the whether the closest intersected triangle is to be counted as a hit.

2. The method of claim 1, wherein the determining determines that the closest intersected triangle is to be counted as a hit, and the further operations for shading the ray comprise executing a closest hit shader to shade the triangle.

3. The method of claim 1, wherein:
determining whether the closest intersected triangle is to be counted as a hit comprises determining that the closest intersected triangle is to be counted as a hit; and
determining that the closest intersected triangle is to be counted as a hit comprises either:
determining that an intersection shader and an any-hit shader are not defined for the material associated with the material data structure, or
determining both that:
an any-hit shader or intersection shader is defined for the material associated with the material data structure; and that
evaluating the any hit shader or the intersection shader results in a determination that the closest intersected triangle is to be counted as a hit.

4. The method of claim 1, wherein the determining determines that the closest intersected triangle is not to be counted as a hit, and the further operations for shading the ray comprise traversing an acceleration structure using a continuation ray to determine a second closest intersected triangle, and writing a second material data item for the continuation ray into a second material data structure associated with a material of the second closest intersected triangle.

5. The method of claim 4, wherein the continuation ray extends from a point of intersection between the ray and the closest intersected triangle in the direction of the ray.

6. The method of claim 1, wherein the ray generation shader program is executed for multiple rays concurrently in a single instruction multiple data manner.

7. The method of claim 1, wherein the second wave executing the follow-on shader executes for multiple rays concurrently in a single instruction multiple data manner, wherein at least one ray of the multiple rays determines that the closest intersected triangle is to be counted as a hit concurrently with another ray of the multiple rays determining that the closest intersected triangle is to be counted as a miss.

8. The method of claim 7, wherein the multiple rays originate from material data items generated by different instances of shader programs.

9. The method of claim 1, wherein the follow-on shader is configured to determine that the ray intersects no triangles, and is therefore counted as a miss, and to write a material data item into a material data structure associated with a miss material, for processing by a miss shader program.

10. An accelerated processing device ("APD") configured to perform ray tracing for a ray, the accelerated processing device comprising:
a compute unit configured to execute, with a first wave, a ray generation shader program configured to detect a closest intersected triangle for the ray, and to write out a first material data item for the ray, into a material data structure associated with a material of the closest intersected triangle; and
a scheduler configured to:
identify a plurality of material data items from the material data structure, wherein the plurality of material data items, wherein the plurality of material data items includes the first material data item, and one or more material data items generated by waves other than the first wave; and
launching a second wave executing a follow-on shader with the identified plurality of material data items, wherein the follow-on shader is configured to:
determine whether the closest intersected triangle is to be counted as a hit; and
perform further operations for shading the ray based on the whether the closest intersected triangle is to be counted as a hit.

11. The APD of claim 10, wherein the determining determines that the closest intersected triangle is to be counted as a hit, and the further operations for shading the ray comprise executing a closest hit shader to shade the triangle.

12. The APD of claim 10, wherein:
determining whether the closest intersected triangle is to be counted as a hit comprises determining that the closest intersected triangle is to be counted as a hit; and
determining that the closest intersected triangle is to be counted as a hit comprises either:
determining that an intersection shader and an any-hit shader are not defined for the material associated with the material data structure, or determining both that:
an any-hit shader or intersection shader is defined for the material associated with the material data structure; and that
evaluating the any hit shader or the intersection shader results in a determination that the closest intersected triangle is to be counted as a hit.

13. The APD of claim 10, wherein the determining determines that the closest intersected triangle is not to be counted as a hit, and the further operations for shading the ray comprise traversing an acceleration structure using a continuation ray to determine a second closest intersected triangle, and writing a second material data item for the continuation ray into a second material data structure associated with a material of the second closest intersected triangle.

14. The APD of claim 13, wherein the continuation ray extends from a point of intersection between the ray and the closest intersected triangle in the direction of the ray.

15. The APD of claim 10, wherein the ray generation shader program is executed for multiple rays concurrently in a single instruction multiple data manner.

16. The APD of claim 10, wherein the second wave executing the follow-on shader executes for multiple rays concurrently in a single instruction multiple data manner, wherein at least one ray of the multiple rays determines that the closest intersected triangle is to be counted as a hit concurrently with another ray of the multiple rays determining that the closest intersected triangle is to be counted as a miss.

17. The APD of claim 16, wherein the multiple rays originate from material data items generated by different instances of shader programs.

18. The APD of claim 10, wherein the follow-on shader is configured to determine that the ray intersects no triangles, and is therefore counted as a miss, and to write a material data item into a material data structure associated with a miss material, for processing by a miss shader program.

19. A computing device, comprising:
a central processor; and an accelerated processing device ("APD") configured to perform ray tracing for a ray, the accelerated processing device comprising:
 a compute unit configured to execute, with a first wave, a ray generation shader program received from the central processor, the ray generation shader program configured to detect a closest intersected triangle for the ray, and to write out a first material data item for the ray, into a material data structure associated with a material of the closest intersected triangle; and
 a scheduler configured to:
identify a plurality of material data items from the material data structure, wherein the plurality of material data items, wherein the plurality of material data items includes the first material data item, and one or more material data items generated by waves other than the first wave; and
launch a second wave executing a follow-on shader with the identified plurality of material data items, wherein the follow-on shader is configured to:
 determine whether the closest intersected triangle is to be counted as a hit; and
 perform further operations for shading the ray based on the whether the closest intersected triangle is to be counted as a hit.

20. The computing device of claim 19, wherein the determining determines that the closest intersected triangle is to be counted as a hit, and the further operations for shading the ray comprise executing a closest hit shader to shade the triangle.

* * * * *